Figure 11:
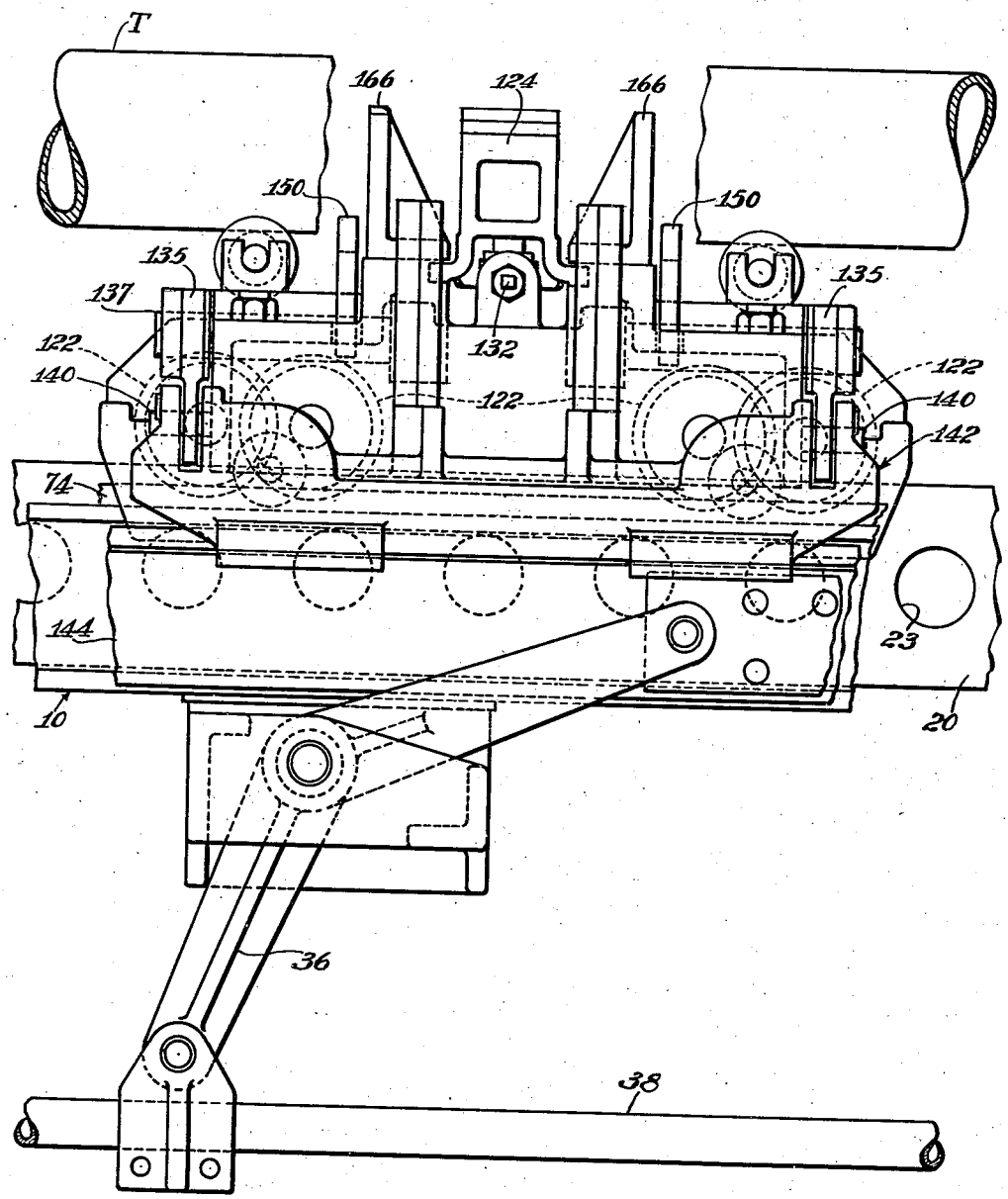

Dec. 19, 1939.  C. A. RICHARDSON  2,183,974
APPARATUS FOR TESTING TUBULAR MEMBERS
Filed April 8, 1937  7 Sheets-Sheet 1
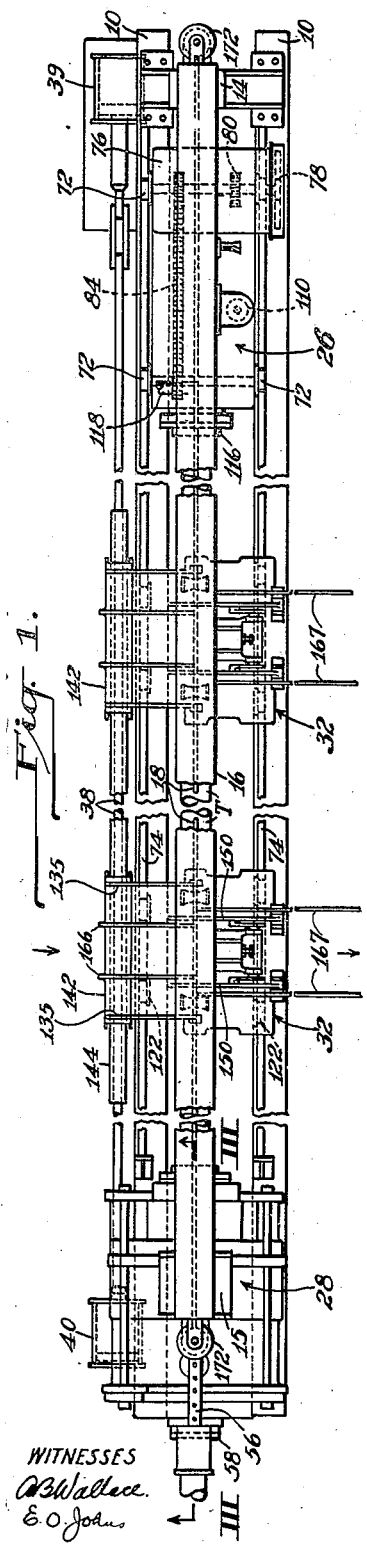
INVENTOR.
Charles A. Richardson
BY Brown, Critchlow & Flick
his ATTORNEYS Dec. 19, 1939.   C. A. RICHARDSON   2,183,974
APPARATUS FOR TESTING TUBULAR MEMBERS
Filed April 3, 1937   7 Sheets-Sheet 2
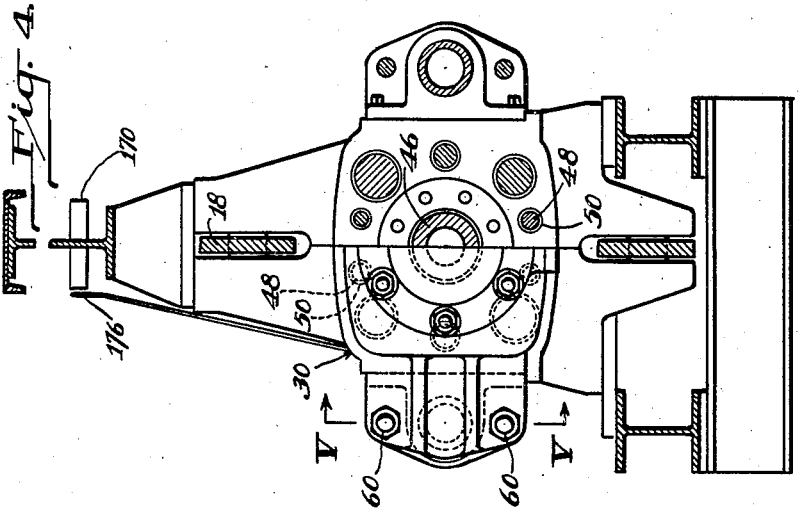
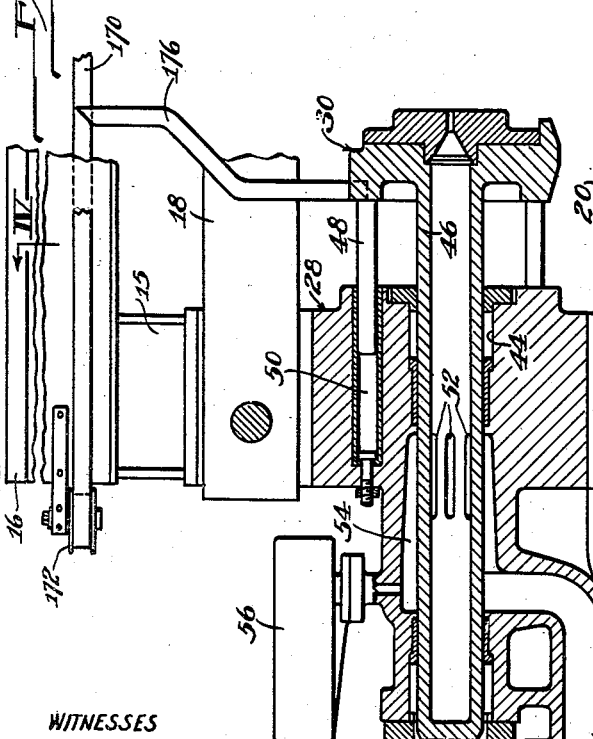
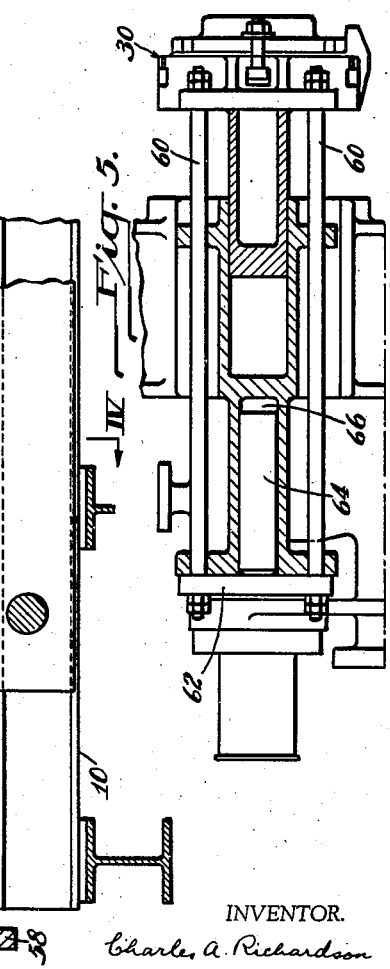
WITNESSES
A B Wallace.
E O Johns
INVENTOR.
Charles A. Richardson
BY Brown, Critchlow & Flick
his ATTORNEYS.

Dec. 19, 1939.  C. A. RICHARDSON  2,183,974
APPARATUS FOR TESTING TUBULAR MEMBERS
Filed April 8, 1937  7 Sheets-Sheet 3
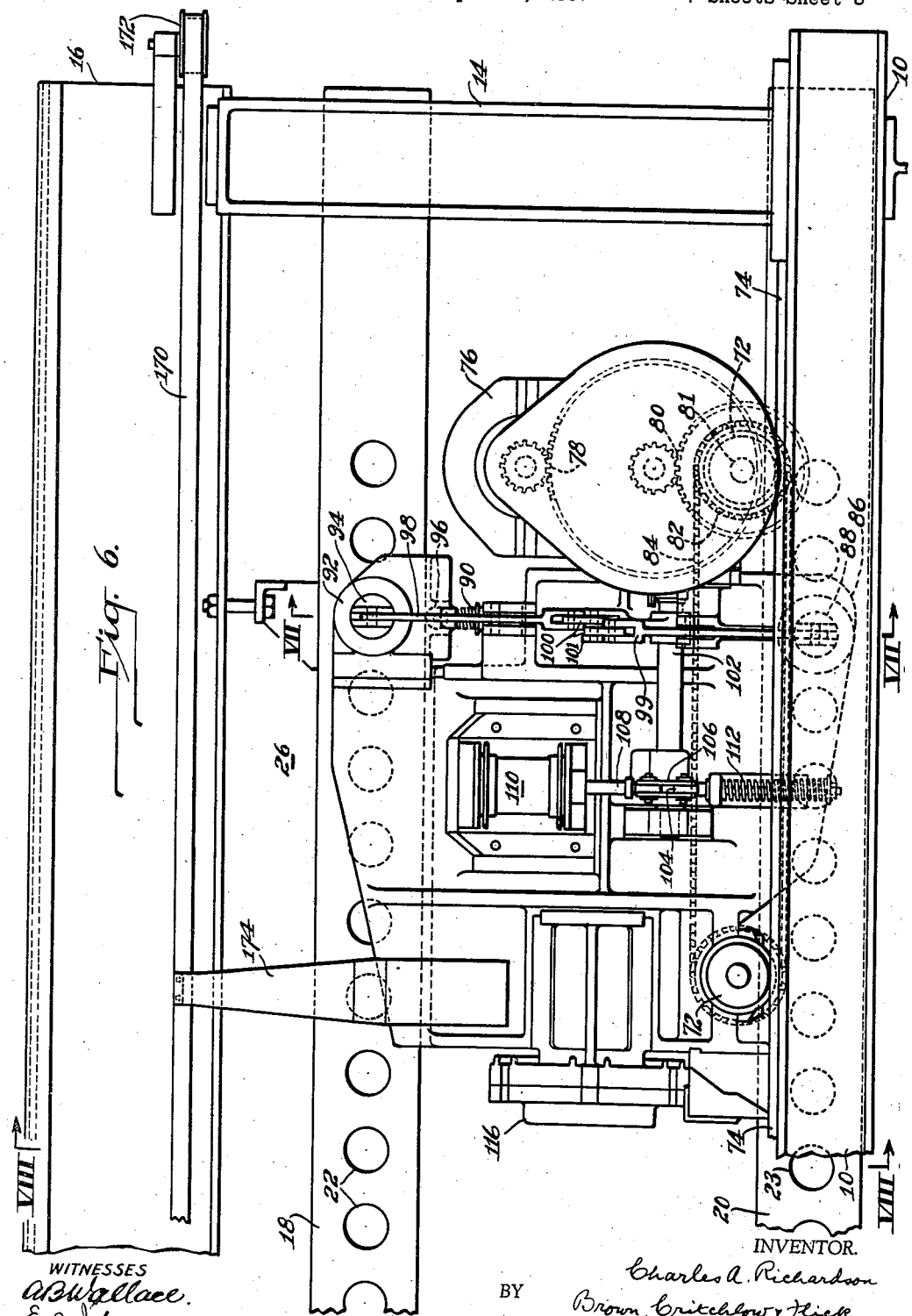
INVENTOR.
Charles A. Richardson
BY Brown, Critchlow & Flick
his ATTORNEYS.

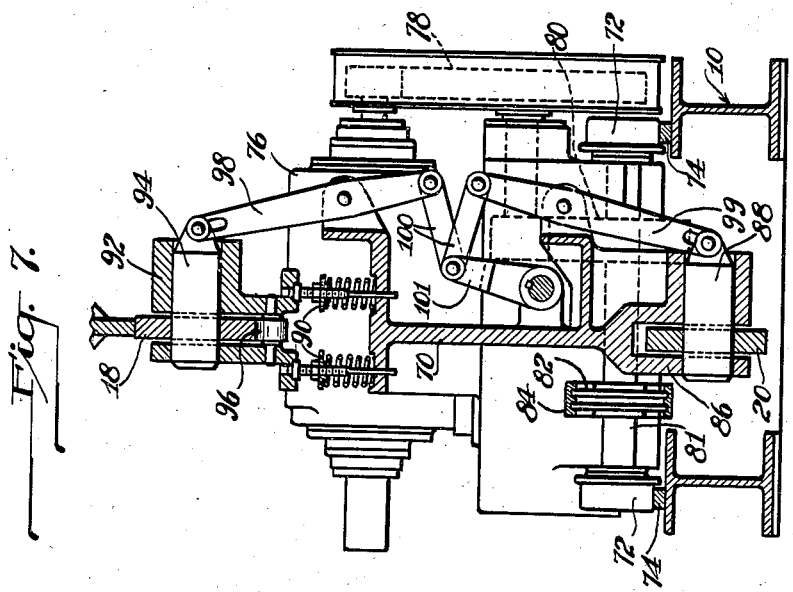

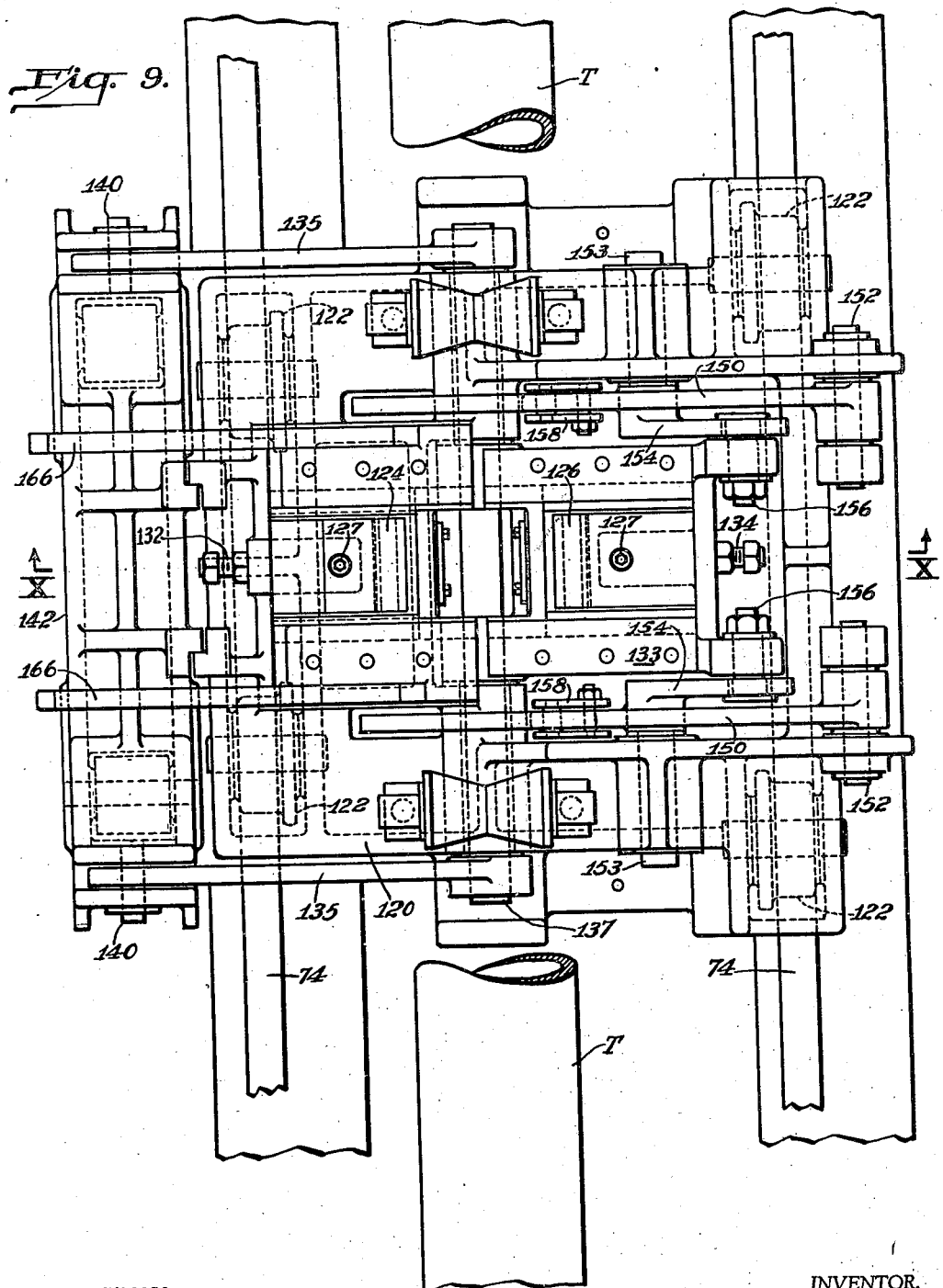

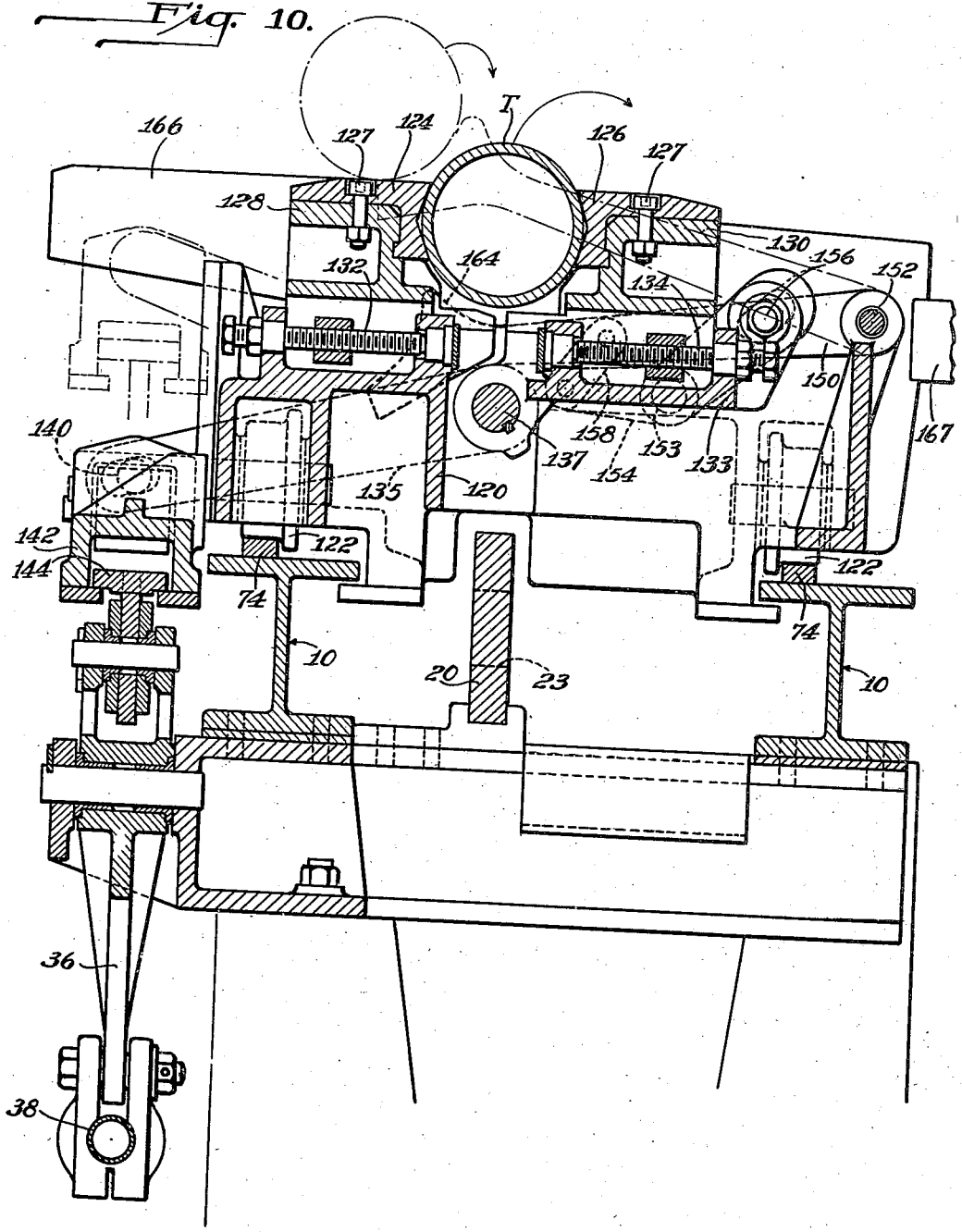

Dec. 19, 1939.   C. A. RICHARDSON   2,183,974
APPARATUS FOR TESTING TUBULAR MEMBERS
Filed April 8, 1937   7 Sheets-Sheet 7

WITNESSES
A B Wallace.
E. O. Johns

INVENTOR.
Charles A. Richardson
BY Brown, Critchlow & Flick
his ATTORNEYS.

Patented Dec. 19, 1939

2,183,974

UNITED STATES PATENT OFFICE 2,183,974

APPARATUS FOR TESTING TUBULAR MEMBERS

Charles A. Richardson, Pittsburgh, Pa., assignor to United Engineering & Foundry Company, Pittsburgh, Pa., a corporation of Pennsylvania Application April 8, 1937, Serial No. 135,741

13 Claims. (Cl. 73—51)

This invention relates to apparatus for testing leak resisting characteristics of tubular members and more particularly is concerned with apparatus for testing welded pipe of relatively large size and length by subjecting it to internal fluid pressure.

In the manufacture of tubular members and particularly welded pipe, it is standard practice where these members or pipes are to be used to convey fluid under pressure to subject them to a final manufacturing test of internally applied fluid pressure. Heretofore various apparatus to perform the indicated test has been suggested and employed. Known apparatus is, however, open to various objections which include (a) the inability to rapidly adapt the apparatus to take a plurality of sizes of pipe to be tested, (b) inability to inspect and operate on the pipe during the test, (c) slowness of operation of the apparatus in receiving, clamping and releasing the pipe tested, (d) initial cost and up-keep expenses, and (e) labor required in operation.

It is the general object of my invention to avoid and overcome the foregoing and other difficulties of and objections to known types of pipe testing apparatus by the provision of improved apparatus adapted to quickly and satisfactorily receive, test and expel pipe or other tubular members of widely varying sizes and in which the member tested can be observed and operated on during the testing operation while adequately supported at a plurality of points spaced along its length.

The foregoing and other objects of my invention are achieved by the provision of testing apparatus including a frame carrying a housing at one end which reciprocably carries a head movable by suitable means into fluid tight relation with one end of the tubular member tested. Means are provided for supplying fluid under pressure to the interior of the head and thus to the inside of the pipe. Movably mounted on the other end of the frame and adapted to engage with the other end of the member tested is a head having means for moving it to and from, and locking it in any of a plurality of positions relative to the first-named head. Positioned between the heads and movably carried on the frame are a plurality of carriages with means for moving the carriages to distribute them between the heads regardless of the position thereof. Each carriage supports clamping means in alignment with the heads and completing the assembly are means for simultaneously operating the clamping means and means for ejecting the pipe from between the clamping means when they are open.

In the accompanying drawings, Fig. 1 is a plan view of one embodiment of testing apparatus incorporating the principles of my invention; Fig. 2 is a side elevation partly broken away of the apparatus shown in Fig. 1; Fig. 3 is a longitudinal vertical sectional view of the housing and reciprocable head of the apparatus as taken on line III—III of Fig. 1; Fig. 4 is a transverse vertical cross-sectional view taken on line IV—IV of Fig. 3; Fig. 5 is a longitudinal vertical cross-sectional view taken on line V—V of Fig. 4; Fig. 6 is a side elevation on a larger scale of the movable head shown in Figs. 1 and 2; Fig. 7 is a transverse vertical cross-sectional view taken on line VII—VII of Fig. 6; Fig. 8 is a transverse vertical cross-sectional view taken on line VIII—VIII of Fig. 6; Fig. 9 is a plan view but on a larger scale of one of the clamping carriages illustrated in Fig. 1; Fig. 10 is a transverse vertical cross-sectional view taken on line X—X of Fig. 9; and Fig. 11 is a rear elevation, partly broken away, of the carriage clamping means of the invention.

Broadly, the apparatus constructed in accordance with the principles of my invention, is adapted to test tubular members of substantially any type by applying fluid under pressure to the interior thereof. Specifically, however, it is adapted to test pipe and particularly longitudinally welded pipe of from about 2 to about 16 inches in diameter and of any desired wall thickness and from about 10 to about 50 feet long.

Frame and general assembly

Referring particularly to the accompanying drawings, the numeral 10 indicates generally a frame mounted upon any suitable foundation 12 and including uprights 14 and 15 carrying a longitudinally extending, centrally positioned overhead beam 16. The frame 10 likewise carries centrally positioned, longitudinally extending plates 18 and 20 which are secured between the uprights 14 and 15 in the position best shown in Fig. 2. The plates 18 and 20 are provided with a plurality of transverse holes 22 and 23 to which a movable head, indicated generally by the numeral 26, is adapted to be adjustably secured. The uprights 15 at the end of the frame 10 opposite the movable head 26 are secured to a housing, indicated as a whole by the numeral 28, which reciprocably carries a head 30. A tubular member T, such as a pipe to be tested, is adapted to be clamped between the heads 26 and 30. Completing the general assembly of the apparatus are a plurality of clamping carriages, generally about four, each indicated as a whole by the numeral 32, which carriages are movable supported on the frame 10 between the heads 26 and 30 so that the clamping means on the carriages are in alignment with the tube T when in the position shown. The carriages 32 are connected end to end by lengths of chain 34 to the head 26 and the housing 28 so that regardless of the position of the head 26 with respect to the housing 28 the carriages will be positioned between the heads so as to adequately support the tubular member T during the testing operation. Pivotally mounted on the frame 10 at a plurality of longitudinally spaced points are a plurality of bell-cranks 36 each having their lower arm pivotally secured to a longitudinally extending rod 38 operable by fluid pressure motors 39 and 40, which mechanism, as hereinafter described, effects the clamping and the ejection of the tubular member T by the carriages 32.

*Stationary housing carrying reciprocating head*

As best illustrated in Figs. 3, 4 and 5, the housing 28, associated with the uprights 15 at one end of the frame 10, comprises an axial bore 44 which slidably receives a hollow tubular member 46 formed integral with the head 30. Likewise secured to the head 30 are a plurality of piston rods 48 each received in a suitable longitudinally extending cylinder 50 provided in the housing so that upon supplying fluid under pressure to the interior of the cylinders 50 the head 30 is moved into fluid tight relation with one end of the tubular member T adapted to be tested. The hollow member 46 associated with the head is provided with a plurality of slots 52 substantially midway of its length which are surrounded by a chamber 54 provided by an extension of the housing 28, which chamber is adapted to be connected to a source of fluid under pressure as by a connection 56. A release port including an L 58 is likewise connected to the chamber 54.

In order to return the head 30 to a retracted position, each lateral side of the head 30 is connected to longitudinally extending rods 60 slidably received by the housing 28 and fastened at their other ends to a spanner plate 62 secured to a piston 64 slidably received in a chamber 66 provided in the housing. The release of the fluid under pressure in the cylinders 50 and the supply of fluid under pressure to the cylinders 66 effects the return of the head 30 to a retracted position.

*Adjustably positioned head*

The adjustably positioned head, indicated generally by the numeral 26 and illustrated in particular in Figs. 6, 7 and 8, includes a body portion 70, on which are mounted flanged wheels 72 which ride upon longitudinally extending rails 74 carried by longitudinally extending I-beams of the frame 10. The body portion 70 carries an electric motor 76 which is connected through gearing 78 and 80 to drive the wheels 72 and thereby move the head along the frame as desired. Each pair of wheels 72 may be connected as by axles 81 to which are secured aligned sprockets 82 in turn carrying endless chains 84.

The body 70 is formed with a bifurcated lower portion 86 which extends around the plate 20 and which is provided with a transverse bore receiving a locking pin 88. The upper end of the body portion 70 of the head resiliently supports, as by a gibbed connection thereto and adjustable spring means 90, a bifurcated member 92 in turn provided with a transverse bore receiving a locking pin 94. The bifurcated member 92 surrounds the upper plate 18 and in order to hold the bifurcated member 92 in proper spring-pressed relation with the plate 18 the bifurcated member 92 ordinarily is provided with several rollers 96 which engage with the lower edge of the plate 18.

Mechanism for simultaneously operating the locking pins 88 and 94 may take a plurality of forms. In the embodiment of the invention illustrated, this mechanism includes rocking levers 98 and 99 pivotally secured near their centers to the body 70 and at one end through a pin and slot connection to the locking pins 94 and 88, respectively. The other end of the rocking bars 98 and 99 are connected by links 100 to a lever 101 keyed to a shaft 102 journaled in the body 70. Keyed also to the shaft 102 is a lever 104 which is pivotally connected as by a link 106 to the piston rod 108 of a fluid pressure motor 110 mounted upon the body 70. A compression spring 112 fastened at one end to the lever 104 and in engagement with the body 70 at its other end normally holds the locking pins 88 and 94 in locking position. It will be understood that by operating the fluid pressure motor 110 the locking pins 88 and 94 are moved laterally out of the plates 18 and 20 and that the head 26 is then free to be moved longitudinally along the frame 10 by the motor 76 as desired. However, when the particular length of the member T to be tested has been determined, release of the pressure in the fluid motor 110 permits the compression spring 112 to move the locking pins 88 and 94 into the holes 23 and 22 of the plates 20 and 18, respectively, to firmly lock and anchor the head 26 on the frame 10.

The portion of the head 26 engaging with the end of the tubular member T is indicated particularly by the numeral 116 and comprises a circular member adapted to form a fluid-tight seal with the end of the tubular member. I may provide a longitudinal aperture in the member 116 which can be connected to a conduit 118 to assist in draining fluid from the interior of the tubular member after testing.

*Clamping carriages*

As best seen in Figs. 9, 10 and 11, each clamping carriage movably supported upon the framework 10 at spaced points between the heads 26 and 30, includes a base 120 mounted on flanged wheels 122 which are supported upon the rails 74 carried by the longitudinally extending I-beams of the frame 10. The clamping means associated with each carriage include a relatively fixed jaw 124 and a relatively pivotal jaw 126 which are removably secured, as by bolts 127, to members 128 and 130. The member 128 is, as particularly shown in Figs. 10 and 11, slidably carried upon the base 120 with an adjusting screw 132 permitting lateral adjustment of the position of the jaw 124 so as to adapt the apparatus to handle tubular members of widely varying diameters, as for example from about 2 to about 10 inches in outside diameter. The member 130 is in a similar manner carried by a bracket 133 with screw means, indicated as a whole by the numeral 134, functioning to provide for the ready adjustment of the initial position of the clamp 126 relative to the clamp 124.

The bracket 133 carrying the movable clamp 126 is keyed to a shaft 137 journaled in the base 120 and levers 135 are likewise keyed to the shaft 137. The lever 135 is secured by a pin and slot connection 140 to a C-shaped shoe 142 which slidably receives a T-shaped bar 144 pivotally secured to the uppermost arms of the several bell-cranks 36. As above stated, the lower arm of each bell-crank 36 is pivotally secured to the operating rod 38 so that energizing the fluid pressure motors 39 and 40 effects longitudinal movement of the rod, a rocking of the bell-cranks and a tilting of the lever 135. This movement of the lever 135 swings the bracket 133 carrying the movable clamp 126 away from clamping position. Because of the number of parts in the apparatus, a complete dotted line showing of the movable clamp 126 has not been included in the drawings. However, its operation should be clear from the foregoing description. It will be understood that each of the carriages 32 has a C-shaped shoe 142 in sliding engagement with the T-shaped bar 144 so that the clamping means of the several carriages are simultaneously actuated. In the movement of the carriage along the frame 10, as heretofore described, the shoes 142 slide along the bar 144.

Mechanism for ejecting tubular member from clamping carriages

Each of the clamping carriages 32 is provided with mechanism for ejecting the tubular member from the clamping means associated with the carriages upon opening movement of these means. In the form of the invention illustrated, and having particular reference to Fig. 10, the ejecting mechanism includes with each carriage a pair of levers or fingers 150 which are pivotally secured at one end to a shaft 152 carried by the base 120. Likewise pivotally secured to the base 120 as by a shaft 153 are bell-cranks 154 each having one arm secured by a pin and slot connection 156 to the bracket 133. The other arms of the bell-cranks 154 are each in alignment with one of the levers 150 and are also pivotally connected by links 158 with the levers 150. Thus when the fluid pressure motors 39 and 40 are operated to move the clamp 126 downwardly and away from the clamp 124, the pin and slot connection 156 between the bracket 133 and the bell-crank 154, rocks the bell-cranks to flip up the levers 150 through the engagement and connection between the bell-cranks and the levers 150. Each lever 150 may be formed with a finger portion 164 which engages behind the tubular member during the discharging operation.

It should be understood in the operation of the improved apparatus of my invention that any desired means can be employed to carry tubular members to and from the apparatus. In this connection, I have shown in Fig. 10 transverse skids or guides 166 and 167 which respectively receive the tubular member when it is brought to the apparatus and receive the tubular member when it is carried from the apparatus.

Measuring mechanism

Preferably associated with the apparatus is mechanism for measuring or indicating the distance between the heads 26 and 30. In the embodiment of the invention illustrated, this mechanism includes an endless metal tape 170 carried on sheaves 172 journaled at the ends of the longitudinal beam 16 of the frame 10 so that the tape 170 extends on both sides of the beam 16. Secured to the movable head 26 is a vertically extending arm 174 which, as shown in Figs. 2, 6 and 8, is fastened to the tape 170. Thus movement of the head 26 causes corresponding movement of the tape 170. Associated with the housing 28 is a vertically extending pointer arm 176 which extends from the head 30 to a point vertically above the pipe engaging surface of the head and directly behind the tape 170. By properly calibrating the tape 170 from zero at a point vertically above the pipe engaging surface of the head 26 in feet toward the head 30, an exact reading in feet between the two heads can be readily taken by reading the tape opposite the pointer 176 carried by the head 30 and this reading will be correct regardless of whether the movable head has been adjusted or whether the reciprocating head 30 has been moved.

Operation

It is believed that the operation of the embodiment of my invention just described will be evident from that description. Briefly reviewing the operation, however, with the clamping jaws 124 and 126 of each carriage 32 in the open position the tubular member is moved into position between the jaws by rolling it in on the skids 166 so as to position one end adjacent the head 30 which is in the retracted position. Then the movable head 26 is moved along the frame 10 and is locked in the nearest possible position to the end of the tubular member so that the distance between the heads 26 and 30 is slightly greater than the length of the tubular member when the head 30 is in its retracted position, but is less than the length of the member when the head 30 is extended, as heretofore explained. The longitudinal distance between the holes 22 and 23 is less than the reciprocating stroke of the head 30 so that the indicated position of the head 26 can always be obtained. In adjusting the position of the head 26 toward and from the head 30 it will be understood that the clamping carriages 32 automatically distribute themselves between the two heads. This is because the clamping carriages are movably supported on the frame 10 and because they are interconnected by the lengths of chain 34. Thus when the head 26 is moved away from the head 30 the carriages are picked up one by one as the chains 34 tighten so that the carriages are evenly distributed between the heads when the head 26 is moved completely to the end of the frame 10. When the head 26 is moved to its other extreme position, namely toward the head 30, the head 26 picks up the carriages 32 one by one so that at least the same support is given the tubular member in either extreme position of the head 26. In any intermediate positions of the head 26 the carriages 32 will be distributed between the heads to provide adequate support for the tubular member during testing as will be understood.

With the tubular member in position between the clamping jaws and in alignment with the heads 26 and 30, fluid under pressure is admitted to cylinders 50 which forces the head 30 into sealing engagement with one end of the tubular member and likewise forces the other end of the member into sealing engagement with the head 26. The fluid pressure motor 40 is now operated which simultaneously moves the clamping jaws 124 and 126 of each carriage 32 into clamping engagement with the sides of the tubular member. Fluid under pressure is now supplied by way of the conduit 56 to the interior of the tubular member being tested. Dependent upon the size, wall thickness, character and use, the extent of duration and the amount of fluid pressure is controlled in accordance with known or specified requirements. Likewise additional tests on the tubular member during the internal pressure test, as for example pounding the tubular member, can be readily accomplished due to the accessibility of the tubular member during the entire internal pressure test. It is also easy for an inspector to walk along the front of the testing apparatus and carefully inspect substantially the entire surface of the tubular member.

Once the test has been completed the fluid under pressure in the interior of the tubular member is withdrawn by way of conduits 58 and 118 and the head 30 is moved to its retracted position by supplying fluid under pressure to the cylinders 66 after first releasing the pressure from the cylinders 50. The fluid pressure motor 39 is then energized after releasing the pressure from the motor 40 which through rod 38, bellcranks 36 and linkage heretofore described, opens the clamping jaws 126 and likewise moves ejecting arms 150 upwardly into engagement with the bottom of the tubular member to move it vertically from between the clamping jaws. The tubular member then rolls out over the surface of the arms 150 and upon the skids 167. The apparatus is now ready for the repetition of the testing cycle on tubular members of the same size. Likewise, the apparatus is capable, as heretofore described, of ready adjustment to adapt it to handle tubular members of varying length and diameter.

Summary

From the foregoing description it will be evident that by the present invention I have provided substantially automatic apparatus for rapidly and effectively testing tubular members by applying fluid under pressure to the interior thereof. My apparatus is capable of handling tubular members of varying sizes both as to diameter and over-all length. Particularly is it advantageous to rapidly handle tubular members of the same diameter and varying length inasmuch as substantially all electrically welded pipe varies considerably in length and my apparatus is capable of testing such pipe with a minimum of time and labor. The tubular member being tested is supported during the testing operation so that it can be readily pounded during the test and so that substantially its entire surface is free to be inspected for faults. Various other features of novelty heretofore discussed and hereinafter claimed characterize my advance over known types of apparatus for testing tubular members.

While in accordance with the patent statutes one embodiment of my invention has been illustrated and described in detail, it should be appreciated that it is not limited thereto or thereby but is defined in the appended claims.

I claim:

1. Apparatus for testing tubular members comprising a frame, a housing fixed to one end of the frame, a head reciprocably carried by the housing, means for moving the head into fluid-tight relation with one end of the tubular member, means for supplying fluid under pressure to the interior of the head and thus to the inside of the tubular member, a head adapted to engage with the other end of the tubular member and movably mounted at the other end of the frame, means for moving the last-named head to and from the first-named head, means for locking the last-named head in any of a plurality of positions relative to the first-named head, means for indicating the distance between the heads, a plurality of carriages movably mounted on the frame between the heads, means for moving the carriages to distribute them between the heads regardless of the position of the heads, means carried by the carriages in alignment with the heads for clamping about the tubular member, means for adjusting the distance between the member engaging surfaces of the clamping means, means for simultaneously operating the clamping means regardless of the position of the carriages, and means for ejecting the tubular member from between the clamping means when the clamping means are opened.

2. Pipe testing apparatus comprising means for sealing against the ends of a pipe, means for supplying fluid under pressure to the interior of the pipe, means for clamping against the sides of the pipe, means for distributing the clamping means along the sides of the pipe and operable by the position of the sealing means, a prime mover, mechanical means connecting the prime mover and all the clamping means and adapted to operate the clamping means regardless of their position, and means for ejecting the pipe from the clamping means when they are opened.

3. Pipe testing apparatus comprising means for sealing against the ends of a pipe, means for supplying fluid under pressure to the interior of the pipe, means for clamping against the sides of the pipe, means for distributing the clamping means along the sides of the pipe and operable by the position of the sealing means, and means for simultaneously operating the clamping means regardless of their position.

4. In combination in pipe testing apparatus, means removably engaging with and closing the ends of the pipe, means for supplying fluid under pressure to the interior of the pipe, means for adjusting the pipe-closing means to handle pipe of different lengths, means for supporting the sides of the pipe at longitudinally spaced, relatively small areas during testing so that substantially all the pipe can be seen and inspected, said means being movable toward and from the pipe-closing means, and means operable by the positioning of the pipe-closing means for positioning the pipe supporting means.

5. In combination in apparatus for testing tubular members, a fixed head adapted to clamp in sealing relation against one end of the member, a movable head adapted to clamp in sealing relation against the other end of the member, a plurality of movably mounted supports for the member positioned between the fixed and the movable heads, and flexible strand elements securing each movable support to the adjacent movable support and the movable head to the nearest movable support.

6. In combination in apparatus for testing tubular members, a fixed head adapted to clamp in sealing relation against one end of the member, a movable head adapted to clamp in sealing relation against the other end of the member, a plurality of movably mounted supports for the member positioned between the fixed and the movable heads, means connecting the movable head to the nearest movable support, said means preventing the head and support from being moved apart more than a predetermined distance but constructed and arranged to allow the head and support to be moved completely together, and connecting means similar to those last described which connect the remaining movable supports to each other and to the support connected to the movable head.

7. Apparatus for testing tubular members comprising a frame, a housing fixed to one end of the frame, a head reciprocably carried by the housing, means for moving the head into fluid-tight relation with one end of the tubular member, means for supplying fluid under pressure to the interior of the head and thus to the inside of the tubular member, a head adapted to engage with the other end of the tubular member and movably mounted at the other end of the frame, means other than the named head moving means for effecting relative movement between the last-named head and the first-named head, means for locking the heads in any of a plurality of relative positions, a plurality of carriages movably mounted on the frame between the heads, means connecting the carriages to the movably mounted head so that they can be moved completely together but not more than a predetermined limited distance apart, means carried by the carriages in alignment with the heads for clamping about the tubular member, mechanical means for simultaneously operating the clamping means regardless of the position of the carriages, and means for ejecting the tubular member from between the clamping means when the clamping means are opened.

8. Apparatus for testing tubular members comprising a frame, a housing fixed to one end of the frame, a head reciprocably carried by the housing, means for moving the head into fluid-tight relation with one end of the tubular member, means for supplying fluid under pressure to the interior of the head and thus to the inside of the tubular member, a head adapted to engage with the other end of the tubular member and movably mounted at the other end of the frame, means other than the first-named head moving means for effecting relative movement between the last-named head and the first-named head, means for locking the heads in any of a plurality of relative positions, a plurality of carriages movably mounted on the frame between the heads, means connecting the carriages to the movably mounted head so that they can be moved completely together but not more than a predetermined limited distance apart, means carried by the carriages in alignment with the heads for clamping about the tubular member, and mechanical means for operating the clamping means regardless of the position of the carriages.

9. Apparatus for testing tubular members comprising a frame, a housing fixed to one end of the frame, a head carried by the housing, means for supplying fluid under pressure to the interior of the head and thus to the inside of the tubular member, a head adapted to engage with the other end of the tubular member and mounted at the other end of the frame, means for moving the last-named head and the first-named head relative to each other to clamp a tubular member therebetween, means for indicating the distance between the heads, a plurality of carriages movably mounted on the frame between the heads and constructed and arranged to be moved substantially into end to end contact when the heads are moved as near together as possible, means for picking up and moving the carriages one by one to space them apart when the heads are moved as far apart as possible, and means carried by the carriages in alignment with the heads for clamping about the tubular member.

10. Pipe testing apparatus comprising means for sealing against the ends of a pipe, means for supplying fluid under pressure to the interior of the pipe, means for clamping against the sides of the pipe, means for distributing the clamping means along the sides of the pipe and controlled by the position of the sealing means, means for simultaneously operating the clamping means regardless of their position, and means for simultaneously ejecting the pipe from the clamping means when they are opened.

11. Pipe testing apparatus comprising means for sealing against the ends of a pipe, means for supplying fluid under pressure to the interior of the pipe, means for clamping against the sides of the pipe, means for distributing the clamping means along the sides of pipe and operable by the position of the sealing means, and means for simultaneously ejecting the pipe from the clamping means when they are opened.

12. In combination in pipe testing apparatus, means removably engaging with and closing the ends of the pipe, means for supplying fluid under pressure to the interior of the pipe, means for supporting a portion of the sides of the pipe during testing, said means being movable toward and from the pipe-closing means, and means connected to the pipe-supporting means and to the pipe-closing means and operable by the positioning of the pipe-closing means for positioning the pipe supporting means along the pipe regardless of its length.

13. Apparatus for testing tubular members comprising means mounted for movement to and from each other for sealing against the ends of the tubular member and applying fluid under pressure to the interior thereof, means for adjustably moving the sealing means relative to each other, means movably mounted between the sealing means and adapted to clamp against the sides of the tubular member at longitudinally spaced points, and means connected to said clamping means and at least one of the sealing means for changing the longitudinal position of said clamping means with respect to each other when the sealing means are moved more than a predetermined distance apart.

CHARLES A. RICHARDSON.